US009400892B2

(12) United States Patent
Rajakarunanayake et al.

(10) Patent No.: US 9,400,892 B2
(45) Date of Patent: Jul. 26, 2016

(54) APPARATUS AND METHOD TO SECURE AN ELECTRONIC STORAGE USING A SECURE ELEMENT

(71) Applicant: Broadcom Corporation, Irvine, CA (US)

(72) Inventors: Yasantha Rajakarunanayake, San Ramon, CA (US); William Bunch, Campbell, CA (US); Jacob Mendel, Tel Aviv (IL)

(73) Assignee: Broadcom Corporation, Irvine, CA (US)

( * ) Notice: Subject to any disclaimer, the term of this patent is extended or adjusted under 35 U.S.C. 154(b) by 51 days.

(21) Appl. No.: 13/930,280

(22) Filed: Jun. 28, 2013

(65) Prior Publication Data
US 2015/0007347 A1    Jan. 1, 2015

(51) Int. Cl.
G06F 7/04 (2006.01)
G06F 21/62 (2013.01)
H04W 12/04 (2009.01)
H04W 12/08 (2009.01)

(52) U.S. Cl.
CPC ........... *G06F 21/6218* (2013.01); *H04W 12/04* (2013.01); *H04W 12/08* (2013.01)

(58) Field of Classification Search
CPC .................................................. G06F 21/62
USPC .................................................. 726/26–30
See application file for complete search history.

(56) References Cited

U.S. PATENT DOCUMENTS

| 8,739,260 | B1 * | 5/2014 | Damm-Goossens | H04W 12/06 726/4 |
| 2002/0112178 | A1 * | 8/2002 | Scherr | G06F 21/80 726/4 |
| 2008/0317251 | A1 * | 12/2008 | Foody | G06F 21/62 380/286 |
| 2010/0235922 | A1 * | 9/2010 | Tsusaka | G06F 21/6245 726/26 |
| 2011/0167483 | A1 * | 7/2011 | Lee | H04L 63/104 726/6 |
| 2012/0066517 | A1 * | 3/2012 | Vysogorets | G06F 21/34 713/193 |
| 2013/0174223 | A1 * | 7/2013 | Dykeman | G06F 21/10 726/4 |
| 2013/0174252 | A1 * | 7/2013 | Weber | G06F 21/6218 726/20 |
| 2013/0208893 | A1 * | 8/2013 | Shablygin | H04L 9/0822 380/277 |

OTHER PUBLICATIONS

Pletka et al., "Cryptographic Security for a High-Performance Distributed File System," Mass Storage Systems and Technologies, 2007. MSST 2007. 24th IEEE Conference on Year: 2007 pp. 227-232.*

Rapolu et al., "M-Lock: Accelerating Distributed Transactions on Key-Value Stores through Dynamic Lock Localization," Cloud Computing (Cloud), 2013 IEEE Sixth International Conference on Year: 2013 pp. 179-187.*

* cited by examiner

*Primary Examiner* — Roderick Tolentino
(74) *Attorney, Agent, or Firm* — Sterne, Kessler, Goldstein & Fox P.L.L.C.

(57) ABSTRACT

A secure integrated circuit (IC) to provide access to an electronic storage, the secure IC including a memory and a processor. The processor may generate a first key and a second key, and enable storing the first key in the memory and storing the second key in a device memory of a device. The processor may then receive the second key from the device when the device wants to access the electronic storage, and grant the device access to the electronic storage by using the first key and the second key received from the device.

20 Claims, 5 Drawing Sheets

APPARATUS AND METHOD TO SECURE AN ELECTRONIC STORAGE USING A SECURE ELEMENT

FIELD OF THE DISCLOSURE

The present disclosure is directed to securing an electronic storage using a secure element (e.g., a secure integrated circuit (IC)).

BACKGROUND

The use of electronic storages available to store data, and to access the stored data, over a wireless network (e.g., the Internet) has considerably increased in the past several years. For example, the use of cloud computing is evolving rapidly, with private and commercial entities adapting to this technology. This increase is due to cost-efficient storage and easy access to the stored information offered in the cloud computing environment. Cloud computing also provides almost unlimited storage capacity in addition to simpler backup and recovery measures when compared to the traditional methods of data storage. The storage of data at a network device can be referred to as "cloud storage." It is expected that the trend of adapting to this technology will continue to grow and develop.

Yet, while cloud computing may be beneficial for the reasons discussed above, it should be appreciated that cloud computing also has drawbacks. For example, cloud computing requires that the private and commercial entities surrender the data, that is to be stored on an electronic storage, to the control of a network provider that owns and operates the electronic storage. In other words, the private and commercial entities must agree to the network provider's complete control of the surrendered data. Therefore, security of the surrendered data may be of high importance when the surrendered data is sensitive. In this case, the private and commercial entities would like to ensure that the network provider does not provide access to the sensitive data of the entities to any unauthorized party. Further, the private and commercial entities would like to ensure that no unauthorized party is able to improperly access the system owned and operated by the network provider to gain unauthorized access to their sensitive data.

DETAILED DESCRIPTION

In the following description, numerous specific details are set forth in order to provide a thorough understanding of the disclosure. However, it will be apparent to those skilled in the art that the disclosure including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The present disclosure provides mechanisms to enhance cloud storage within a network. As discussed above, entities that surrender their sensitive data to the control of a network provider want to ensure security of their surrendered data. To that end, exemplary systems and methods are disclosed to secure the electronic storage using a secure IC. The secure IC is associated with the electronic storage, and may control any and all access to the electronic storage. As discussed below, the secure IC controls access to the electronic storage with respect to storing data in the electronic storage and accessing data stored in the electronic storage. For example, the secure element may authenticate, prior to granting access to the electronic storage, any application and/or system function of a device that wants to access the electronic storage. The electronic storage may be internal or external to the device that tries to access the data stored in the electronic storage. Also, the present disclosure contemplates a double key entry system that serves to protect the interests of the corporate or private entities with regards to the security of their sensitive data, and also provides a business model for wireless network providers to generate revenue.

Figure 1:
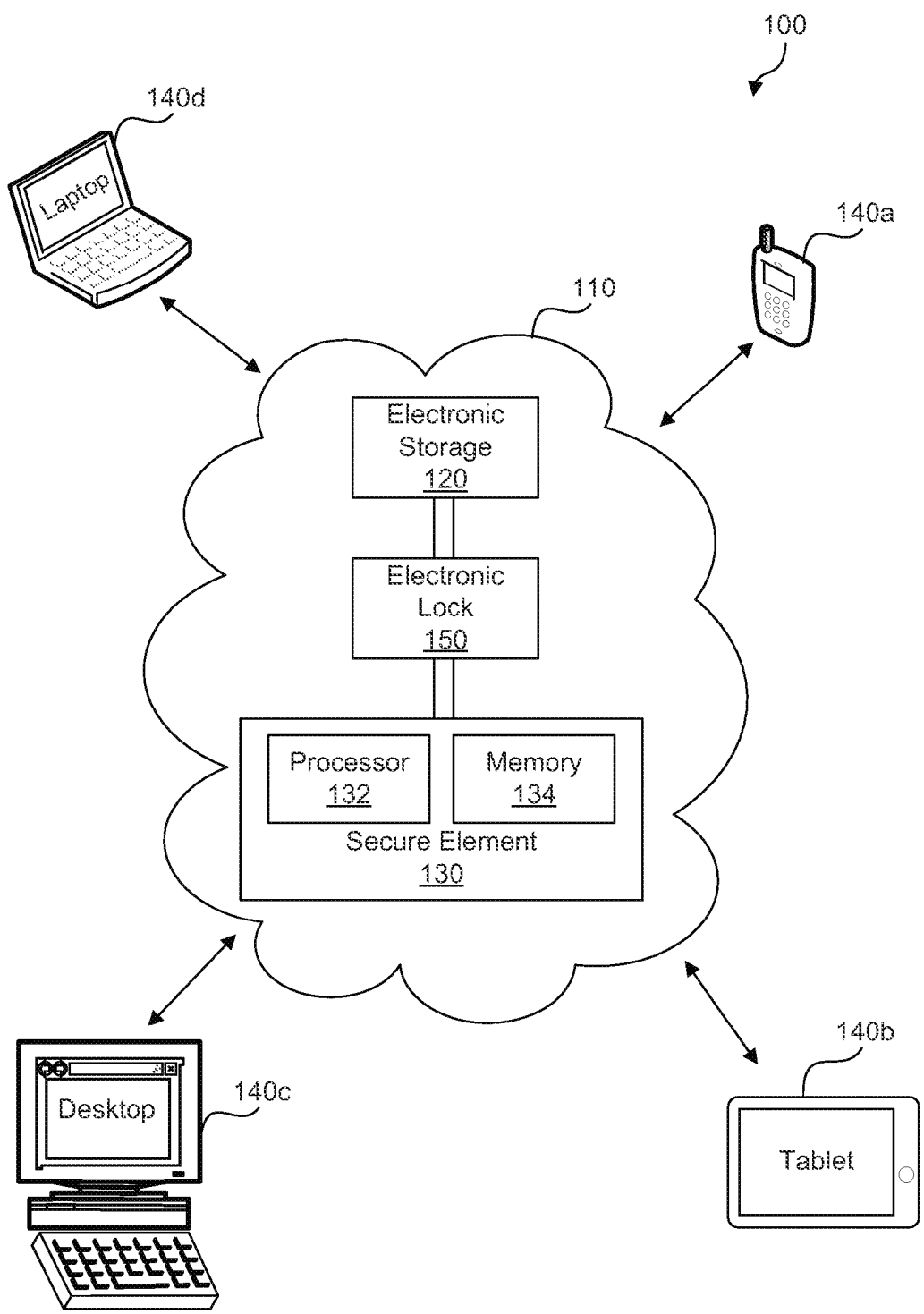
FIG. 1 illustrates an exemplary system for implementing a double key entry system according to an embodiment of the present disclosure.

FIG. 1 illustrates an exemplary system 100 to implement the double key entry system according to an embodiment of the present disclosure. The system 100 may be associated with a wireless network 110. The wireless network 110 may operate over, for example, the Internet protocol. The system 100 includes an electronic storage 120 and a secure element 130 that communicate with at least one remote device 140a-140d over the wireless network 110. The secure element 130 may be a secure IC that includes a processor 132 and a secure memory 134. In one embodiment, only the owner and operator of the secure element may have access to the secure memory 134. The secure element 130 may unlock an electronic lock 150 to allow access to the electronic storage 120. The electronic lock may be implemented, for example, as an electronic function that may provide authorized access to the electronic storage 120 in accordance with the double key entry system. The at least one remote device 140a-140d may include any handheld or portable device like a mobile phone and/or a tablet computer. The at least one remote device 140a-140d may also include a desktop computer and/or a laptop computer.

Each of the at least one remote devices 140a-140d may include an application and/or a device function that can gain access to the electronic storage 120 through the secure element 130. The processor 132 may be capable of authenticating any application and/or device function of the at least one remote device 140*a*-140*d* that wants to gain access to the electronic storage 120. For example, a network provider may own and operate the secure element 130 and the electronic storage 120, and the private or corporate entities may own and operate the at least one remote device 140*a*-140*d*. Further, for example, the network provider may have an established business relationship with the private or corporate entities with respect to allowing access to and use of the electronic storage 120 using the at least one remote device through the secure element 110. While establishing the business relationship, the network provider may require the corporate or private entity to register any remote devices (e.g., devices 140*a*-140*d*) with the secure element 130. In an exemplary embodiment, the secure element 130 may allow the private or corporate entities to use the electronic storage 120 to store their sensitive data thereon.

In an embodiment, the secure element 110 may use the double key entry system to allow access to the electronic storage 120. In the double key entry system, at least two keys are required at the same time to allow access to the electronic storage 120. In an embodiment, the secure element 130 may apply the two keys at the same time to an electronic lock 150 to allow access to the electronic storage 120. The network provider may use the processor 132 to generate, for example, two separate electronic keys, a first key and a second key, to unlock an electronic lock 150 owned and operated by the network provider. In an embodiment, at least a portion of the first key may be identical to a portion of the second key. In one embodiment, the identical portions may be used to implement the double key entry system. For example, prior to applying the two keys to unlock the electronic lock 150, the secure element 130 may compare the identical portions of the first and second keys for a match, and apply the two keys to unlock the electronic lock 150 only when the identical portions match. In another embodiment, the processor 132 may generate the first key using identification information of the network provider and/or network equipment, and may generate the second key using identification information of the corporate or private entity and/or the at least one remote device 140*a*-140*d*. As part of the business relationship, the network provider may maintain possession of the first key by, for example, using the processor 132 to store the first key in the secure memory 134. Also, the corporate or private entity may maintain possession of a respective second key by, for example, storing the second key in a memory associated with the at least one remote device 140*a*-140*d*.

In one embodiment, the secure element 130 may receive, based on user input at the at least one remote device 140*a*-140*d*, an access request from at least one remote device 140*a*-140*d* of the corporate or private entity when the corporate or private entity wants to gain access to the electronic storage 120. The corporate or private entity may wish to gain access to the electronic storage 120 in order to store data to and/or retrieve stored data from the electronic storage 120. Upon receiving the access request, the secure element 130 may authenticate the at least one remote device 140*a*-140*d* from which the access request is received. For example, the secure element 130 may receive an access request from an application and/or system function of the at least one remote device 140*a*-140*d* that wants to gain access to the electronic storage 120. To authenticate the at least one remote device 140*a*-140*d*, the secure element 130 may instruct the at least one remote device 140*a*-140*d* to provide the second key. Upon receiving the second key, the processor 132 of the secure element 130 may simultaneously use the first key stored in the memory 134 and the received second key to unlock the electronic lock 150, and provide access to the electronic storage 120 when the first key and the received second key properly unlock the electronic lock 150. In other words, in an embodiment, access to the electronic storage 120 may not be had unless both, the first key and the second key, are used simultaneously to unlock the electronic lock 150.

Figure 2:
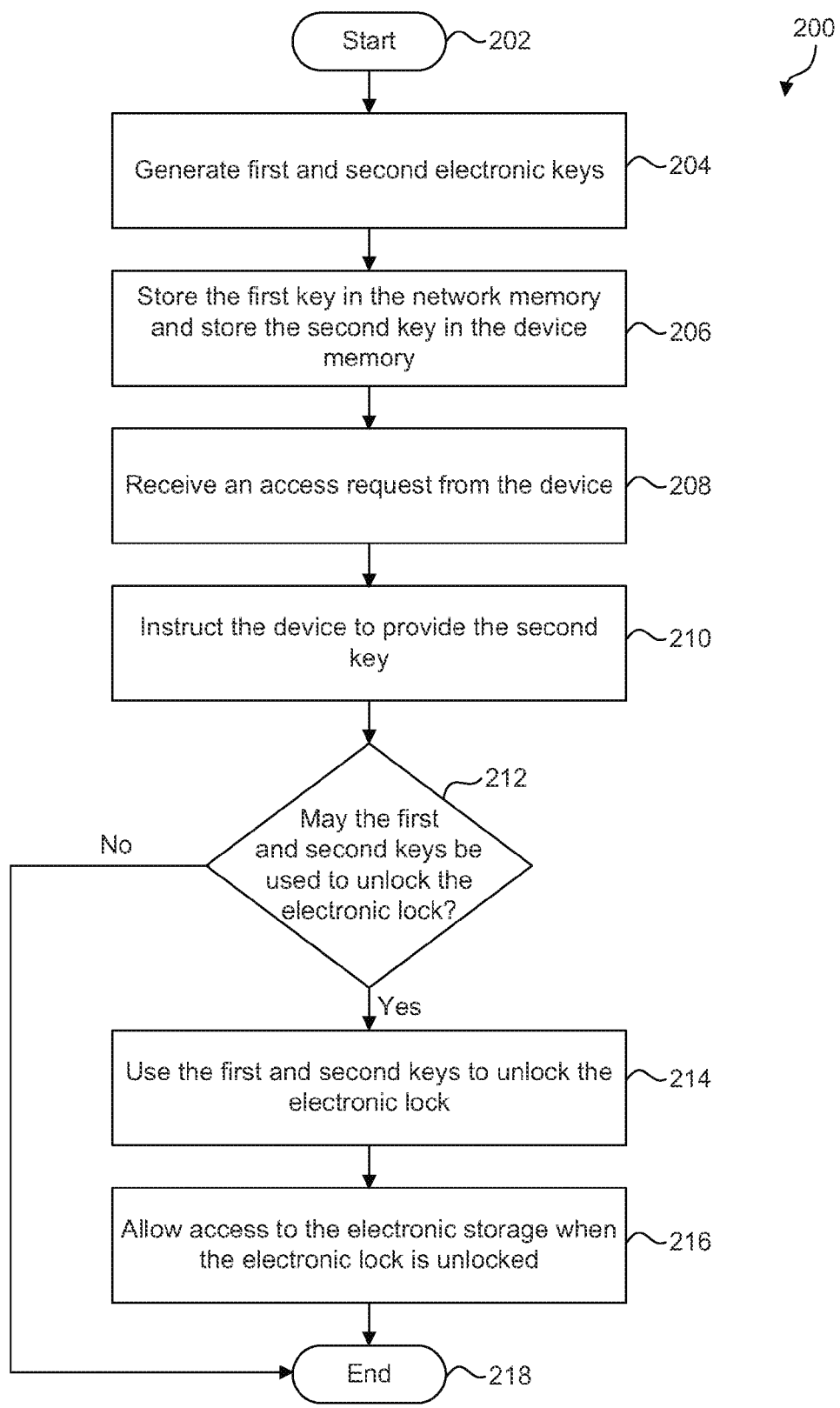
FIG. 2 illustrates an exemplary method for implementing a double key entry system according to an embodiment of the present disclosure.

FIG. 2 illustrates an exemplary method 200 for implementing the double key entry system by the system 100, described above with respect to FIG. 1. The method 200 starts at step 202. At step 204, the processor 132 of the secure element 130 generates two separate electronic keys, a first key and a second key, to be simultaneously used to unlock an electronic lock 150 that is associated with the secure element 130. At step 206, the secure element 130 stores the first key in the memory 134 and provides the second key to the at least one remote device 140*a*-140*d*. At step 208, the secure element 130 receives an access request from the at least one remote device 140*a*-140*d* that wants to gain access to the electronic storage 120. At step 210, upon receiving the access request, the secure element 130 instructs the at least one remote device 140*a*-140*d* to provide the second key. At step 212, the secure element 130 decides whether the first key and the second key may be used together to unlock the electronic lock 150. This includes, for example, comparing identical portions of the first and second keys for a match prior to applying the two keys to unlock the electronic lock 150. The first and second keys may then be applied to unlock the electronic lock 150 when the identical portions match. At step 214, the secure element 130 uses the first key stored in the memory 134 and the received second key to unlock the electronic lock 150. At step 216, the secure element 130 provides access to the electronic storage 120 when the first key and the received second key properly unlock the electronic lock. The method ends at step 218. In this way, the secure element 130 implements the double key entry system to authenticate the at least one remote device 140*a*-140*d* from which the access request is received. The method ends at step 216.

In an embodiment, for increased security, the network provider may implement the above discussed double key entry system to provide multi-site and/or multi-party protection. In other words, the network provider may provide data protection through the above discussed double key entry system to multiple parties by storing the data separately and/or by using multiple electronic storages. The network provider may enable this system by storing parts of the sensitive data separately in the electronic storage 120 or in separate electronic storages. For example, the network provider may store a first part of the sensitive data in a first electronic storage and store a second part of the sensitive data in a second electronic storage. Further, the secure element 130 may generate at least two second keys associated with the separate electronic storages. For example, the one second key may be associated with the first electronic storage and another second key may be associated with the second electronic storage.

In such a double key entry system, a first combination of the first key and the one second key is required simultaneously to access the first part of the sensitive data stored in the first electronic storage, and a second combination of the first key and the another second key is required to access the second part of the sensitive data stored in the second electronic storage. In one embodiment, the first combination and the second combination should be computed simultaneously to access the complete sensitive data. In other words, individual access to the first part or the second part of the sensitive data may be disabled.

The corporate or private entity may maintain possession of the one second key, while a (third-party) trusted entity may maintain possession of the another second key. The trusted entity may be selected by the network provider and/or the corporate or private entity. When the corporate or private entity wants to gain access to the complete sensitive data through the at least one remote device 140a-140d, the secure element 130 receives the access request, and instructs the at least one remote device 140a-140d to provide the one second key. Further, in response to receiving the access request, the secure element 130 may autonomously and simultaneously instruct the trusted entity to also provide the another second key. Similarly, when the trusted entity wants to gain access to the complete sensitive data, the secure element 130 receives the access request, and instructs the trusted entity to provide the another second key. Further, in response to receiving the access request, the secure element 130 may autonomously and simultaneously instruct the corporate or private entity to also provide the one second key. Upon receiving the one second key from the corporate or private entity and upon receiving the another second key from the trusted entity, the processor 132 of the secure element 130 may use, at the same time, the first key stored in the secure memory 134 and the received second keys (the one second key and the another second key) to unlock the electronic lock 150, and provide access to the complete sensitive data when the first combination of the first key and the one second key and the second combination of the first key and the another second key properly unlock the electronic lock 150.

In this way, the double key entry system implemented in system 100 serves to protect the interests of the corporate or private party with regards to the security of their sensitive data. The presently disclosed double key entry system also provides a business model for wireless network providers to generate revenue by charging the corporate or private party for the storage and security services provided to the corporate or private party.

In another embodiment, the network provider may, at the corporate or private party's direction, simply make specific sensitive data stored in the electronic storage 120 available to a third party. For example, without transferring the specific sensitive data, the network provider may simply make available the specific sensitive data for inspection by a third party. To that end, the network provider may use the processor 132 to generate, for example, a temporary second key that is to be used in the double key entry system to unlock the electronic lock. In an embodiment, the processor 132 generates the temporary second key using identification information of the corporate or private entity and/or of the third party and/or of the associated equipment. Also, in an embodiment, the temporary key may be valid only for a given time interval within which the third party is authorized to inspect the specific sensitive data. During the time interval, when the third party wants to inspect the specific sensitive data, the secure element 130 instructs the third party to provide the temporary second key. The secure element 130 then combines the temporary second key with the first key stored in memory 134 to provide the third party with access to the specific sensitive data, as discussed above with respect to FIGS. 1 and 2. In another embodiment, in addition to instructing the third party, the secure element 130 may also autonomously and simultaneously instruct the corporate or private entity to provide the second key. The secure element 130 may then use the first combination of the first key and the second key and the second combination of the first key and the temporary key, as discussed above, to provide the third party access to the specific sensitive data.

Further, sometimes, ownership of sensitive data (e.g., title to property) stored in memory 134 is transferred from a first corporate or private party to a second corporate or private party. In such a case, the network provider may, without transferring the sensitive data, terminate or deactivate the second key provided to the first corporate or private party. Further, the secure element 130 (network provider) may generate a new second key for the second corporate or private party. The new second key may be generated, for example, using the identification information of the second corporate or private party and/or the associated equipment, and may also include an identical portion with respect to the first key. In this way, the network provider may easily and securely provide digital transfer of assets without actually transferring the data.

The present disclosure also contemplates the use of near field technology through near field communication (NFC) devices. For example, in response to the instruction from the secure element 130 to provide the second key, the corporate or private entities may use NFC devices to provide the second key to gain access to the electronic storage 120. The secure element 130 may securely receive the second key through near field technology.

Figure 3:
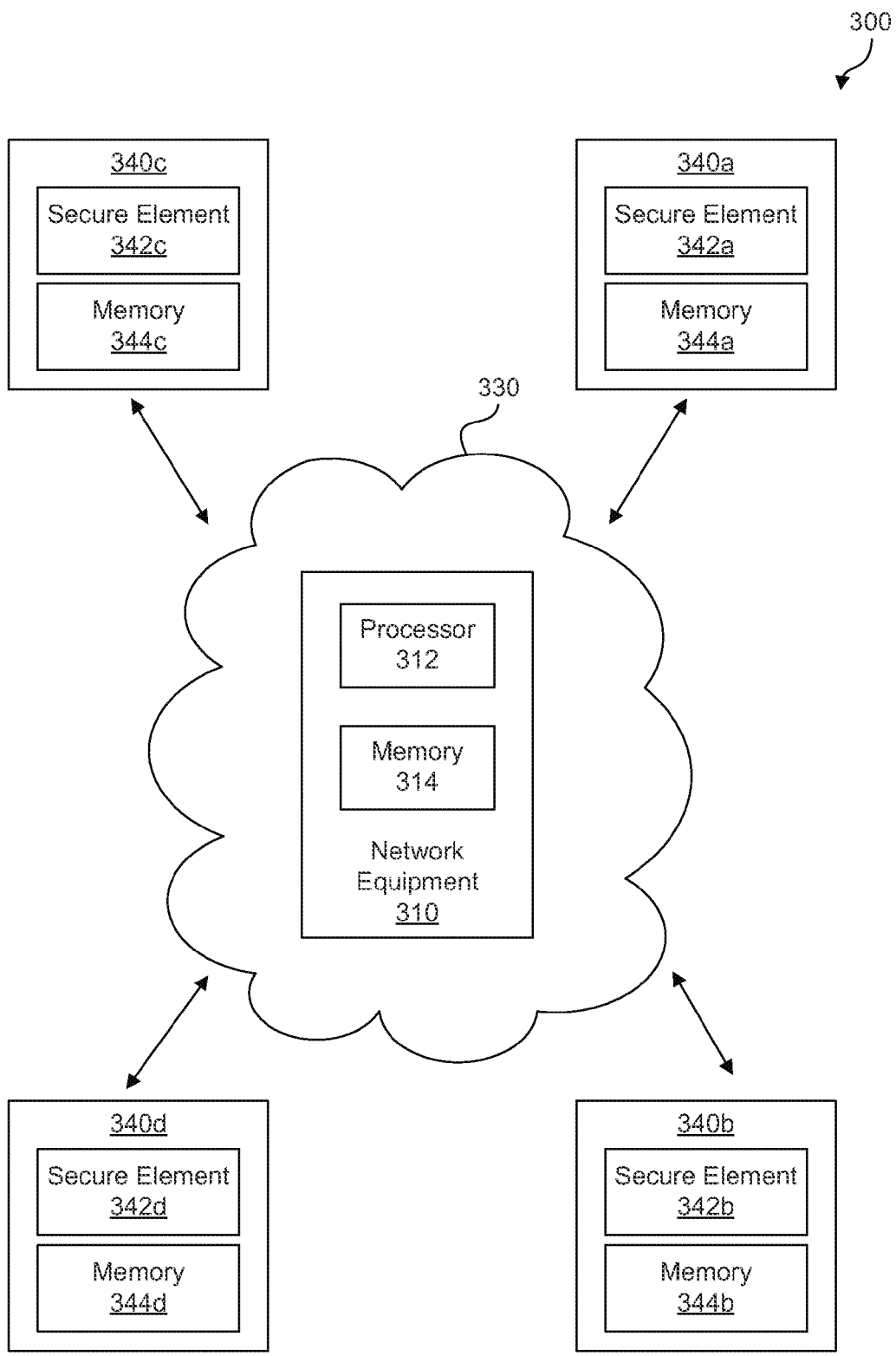
FIG. 3 illustrates an exemplary system for implementing a double key entry system according to another embodiment of the present disclosure.

FIG. 3 illustrates system 300 to implement the double key entry system according to another embodiment of the present disclosure. System 300 includes network equipment 310, which may include a processor 312 and a memory 314, and user equipment 340, which may include at least one device 340a-340d. The network equipment 310 and the user equipment 340 may communicate with each other over a wireless network (e.g., Internet) 330. The at least one device 340a-340d may include any handheld or portable device like a mobile phone, and/or a tablet computer, and/or a desktop computer, and/or a laptop computer. Further, each of the at least one device 340a-340d may include a respective secure element (e.g., secure IC) 342a-342d and a respective memory 344a-344d.

The network provider may have an established business relationship with the user. In an embodiment, the original and unencrypted data of the user is not stored in the local memory 344 or in the network memory 314. Instead, the respective secure element 342 may encrypt the original data using a respective secret pattern. As part of the business relationship, the user equipment 340 maintains possession of the encrypted sensitive data in the respective memory 344, and the network provider equipment 310 maintains possession of the secret pattern in memory 314. When the user wants to access the original and unencrypted data, the user equipment 340 transmits a request to the network equipment 310 to provide the secret pattern. In response to the request, the network provider equipment 310 transmits, and the user equipment 340 receives, the secret pattern stored in memory 314. Upon receiving the secret pattern, the secure element 342 computes the original and unencrypted data based on a combination of the encrypted data and the secret pattern provided by the network provider equipment 310. In an embodiment, the communication between the network provider equipment 310 and the user equipment 340 can also be encrypted and/or be carried over a secure and/or encrypted channel. In this way, security of the original data of the user is ensured without saving the (unencrypted) original data in memory 344 or in remote memory 314.

In an exemplary embodiment, the original and unencrypted data may be a 1000 byte document A. Now, without storing the original 1000 byte document A in memory 314 or in memory 344, the 1000 byte document A is encrypted using a secret pattern S1. For example, for encryption, the 1000 byte document A is Exclusively-ORed with a 1000 byte secret pattern S1. In other words, the original document A is encrypted with a secret pattern having an equal data (e.g., byte) length with respect to the original document A. In one embodiment, a byte of document A is, for example, Exclusively-ORed with a corresponding byte of the secret pattern S1. For example, the first byte of document A is Exclusively-ORed with the first byte of the secret pattern S1, and so on. The user equipment 340 maintains possession of the encrypted document (A^S1) in memory 344, while the network equipment 310 maintains possession of the secret pattern S. When the user equipment 340 wants to access the original document A, the user equipment 340 receives the secret pattern S1 from the network equipment 310. Then the user equipment 340 uses the secure element 342 to compute the original document A based on a combination of the encrypted document (A^S1) and the secret pattern (S1). In one embodiment, the computation to compute or generate the original document A may be represented as S1^(A^S1)=A.

In another embodiment, the user equipment 340 maintains possession of the encrypted document (A*S1) in memory 344, while the network equipment 310 maintains possession of only a version (e.g., $S1^{-1}$) of the secret pattern S. When the user equipment 340 wants to access the original document A, the user equipment 340 receives the version of the secret pattern from the network equipment 310. Then the user equipment 340 uses the secure element 342 to compute the original document A based on a combination of the encrypted document (A*S1) and the version of the secret pattern (e.g., $S1^{-1}$). In one embodiment, the computation to compute or generate the original document A may be represented as $S1^{-1}$*(A*S1)=A.

Figure 4:
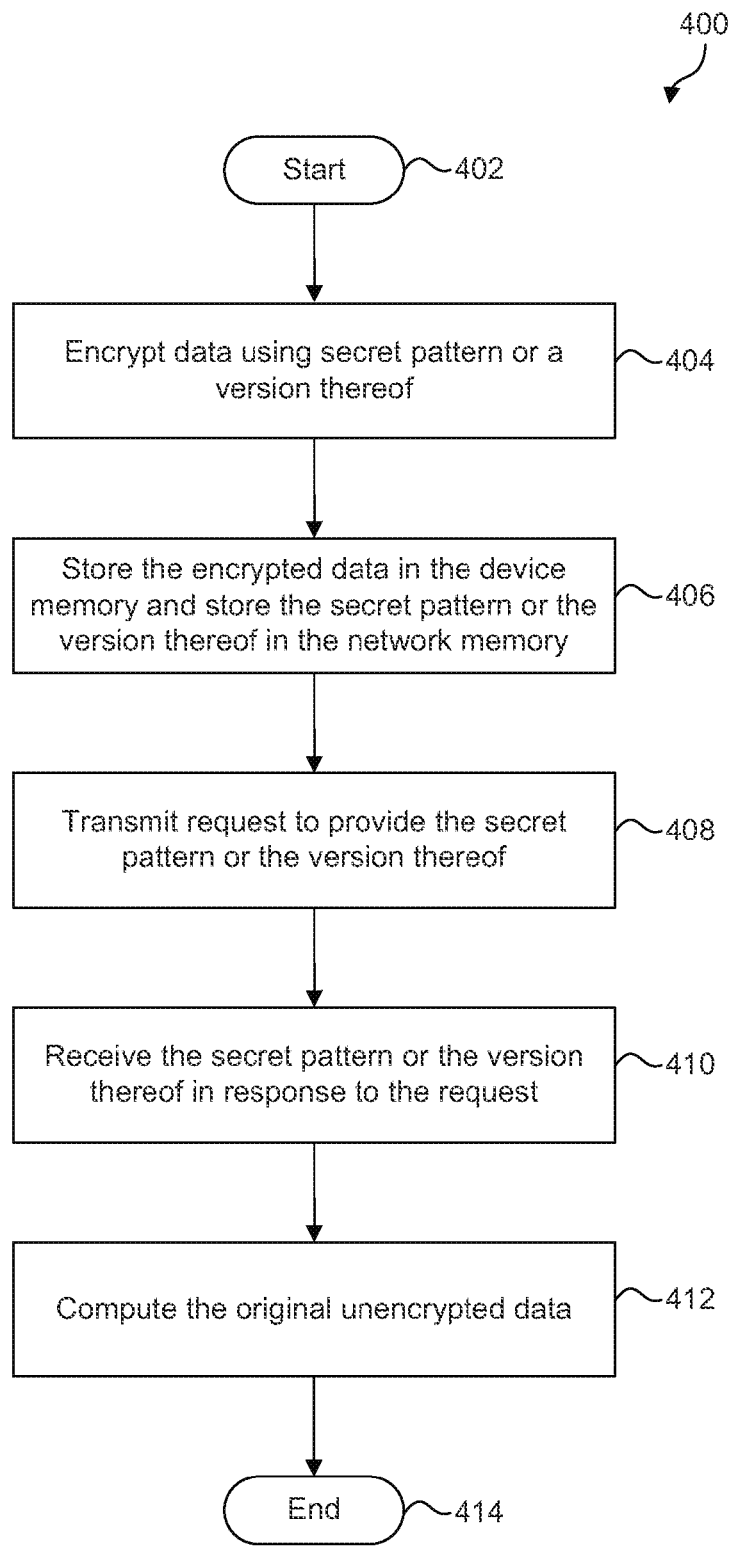
FIG. 4 illustrates an exemplary method for implementing a double key entry system according to another embodiment of the present disclosure.

FIG. 4 illustrates an exemplary method 400 for implementing the double key entry system by the system 300, described above with respect to FIG. 3, according to an embodiment of the present disclosure. The method starts at step 402. At step 404, the secure element 342*a*-342*d* encrypts the user's original data using a secret pattern (or a version thereof). At step 406, the secure element 342*a*-342*d* stores the encrypted sensitive data in the respective memory 344*a*-344*d* and stores the secret pattern (or the version thereof) in the network memory 314. At step 408, when the user wants to access the unencrypted sensitive data, the user equipment 340 transmits, based on an input from the user, a request to the network provider equipment 310 to provide the secret pattern (or the version thereof) to the user equipment 340. At step 410, in response to the request, the network provider equipment 310 transmits, and the user equipment 340 receives, the secret pattern (or the version thereof) stored in memory 314. At step 412, upon receiving the secret pattern (or the version thereof), the secure element 342 computes the unencrypted data based on a combination of the encrypted sensitive data and the secret pattern (or the version thereof) provided by the network provider equipment 310. The method ends at step 414.

In an embodiment, the network provider may also provide a redundancy measure by implementing the double key entry system (discussed with respect to FIGS. 1 and 2) for any data that is stored in the memory 344 at the user equipment 340. For example, the network provider may also store the data stored in memory 344 of the user equipment 340 in a network memory. Further, the network provider may include a secure element (e.g., secure IC) to implement the double key entry system, as discussed with respect to FIGS. 1 and 2, to secure the mirrored data now stored in the memory of the network provider.

It is to be appreciated that communication between the network provider equipment and the user equipment, especially related to the transmission and reception of the keys, etc., can also be completely or partly encrypted, and/or be carried over a secure and/or encrypted channel. In this way, communication between the the network provider equipment and the user equipment may be carried out in a secure manner.

Figure 5:
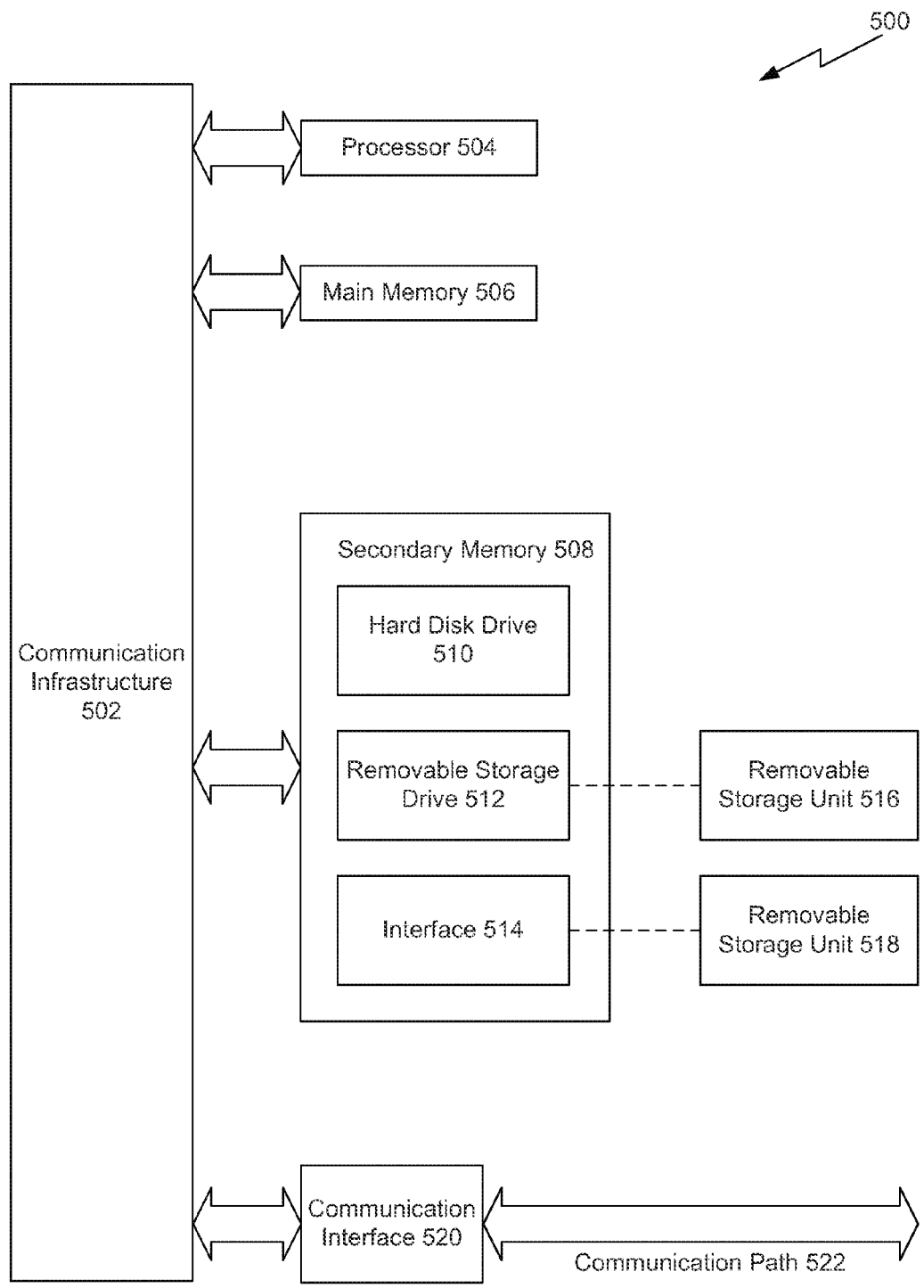
FIG. 5 illustrates a general purpose computer system according to an embodiment of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. One or more of the features depicted in FIGS. 1-4 (e.g., secure element 130, 342; network equipment 310; user equipment 340; etc.) and their corresponding algorithms can be executed on one or more distinct computer systems 500, or a portion thereof. Furthermore, any functions performed by any of the above features can be implemented on one or more distinct computer systems 500.

A computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCMCIA slot and card, etc. Software and data transferred via communications interface 520 are in the form of signals which may be electronic, electromagnetic, optical, or other signals capable of being received by the host device 100. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to non-transitory, tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using a removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A secure integrated circuit (IC) to provide access to an electronic storage, the secure IC comprising:
   a secure memory; and
   a processor configured to:
      generate a first key and a second key;
      enable storing the first key in the secure memory and storing the second key in a device memory of a device;
      receive a request from the device to access the electronic storage;
      instruct the device to provide the second key in response to receiving the request;
      receive the second key from the device; and
      grant the device access to the electronic storage by using the first key and the second key received from the device, wherein, upon receiving the second key from the device, the processor is further configured to determine whether the first key and the second key can be combined to unlock an electronic lock to grant access to the electronic storage based on a comparison of a first portion of the first key and a second portion of the second key, the comparison including determining whether the first portion of the first key is identical to the second portion of the second key, and wherein identical portions of the first and second keys are associated with the electronic storage.

2. The secure IC of claim 1, wherein the processor is further configured to generate the first key using identification information of an apparatus that includes the secure IC and to generate the second key using identification information of the device.

3. The secure IC of claim 1, wherein the processor is further configured to grant the device access to the electronic storage by simultaneously using the first key and the second key to unlock the electronic lock.

4. The secure IC of claim 1, wherein the processor is further configured to receive the second key over a secure channel.

5. The secure IC of claim 4, wherein the processor is further configured to generate a temporary second key, and to temporarily grant another device access to the electronic storage by using the first key and the temporary second key.

6. The secure IC of claim 1, wherein an apparatus that includes the secure IC and the device communicate over a wireless network.

7. The secure IC of claim 1, wherein the processor is further configured to grant access to the device in order to store data to and/or retrieve stored data from the electronic storage.

8. The secure IC of claim 1, wherein the device includes a mobile device.

9. A method for providing access to an electronic storage by a network apparatus including a processor and a secure memory, the method comprising:
   generating, by the processor, a first key and a second key;
   storing the first key in the secure memory and storing the second key in a device memory of a device;
   receiving a request from the device to access the electronic storage;
   instructing the device to provide the second key in response to receiving the request;
   receiving, by the processor, the second key from the device;
   determining whether the first key and the second key can be combined to unlock an electronic lock to grant access to the electronic storage based on a comparison of a first portion of the first key and a second portion of the second key, the comparison including determining whether the first portion of the first key is identical to the second portion of the second key; and
   granting, by the processor to the device, access to the electronic storage by using the first key and the second key received from the device, wherein identical portions of the first and second keys are associated with the electronic storage.

10. The method of claim 9, wherein the generating includes generating the first key using identification information of the apparatus and generating the second key using identification information of the device.

11. The method of claim 9, wherein the granting access includes granting access to the electronic storage by simultaneously using the first key and the second key to unlock the electronic lock.

12. The method of claim 9, further comprising:
receiving the second key over a secure channel.

13. The method of claim 12, further comprising:
generating a temporary second key; and
granting another device temporary access to the electronic storage by using the first key and the temporary second key.

14. The method of claim 9, wherein the granting access includes granting access to the device when the device wants to access the electronic storage in order to store data to and/or retrieve stored data from the electronic storage.

15. A secure integrated circuit (IC) to provide access to an electronic storage, the secure IC comprising:
a secure memory; and
a processor configured to:
generate a first key and a second key;
enable storing the first key in the secure memory and storing the second key in a device memory of a device;
receive a request to access the electronic storage and the second key from the device, the second key being associated with the request to access the electronic storage; and
determine whether to grant the access to the electronic storage to a sender of the request by using the first key and the second key, wherein, upon receiving the second key from the device, the processor is further configured to determine whether the first key and the second key can be combined to unlock an electronic lock to grant access to the electronic storage based on a comparison of a first portion of the first key and a second portion of the second key, the comparison including determining whether the first portion of the first key is identical to the second portion of the second key and wherein identical portions of the first and second keys are associated with the electronic storage.

16. The secure IC of claim 15, wherein the processor is further configured to:
grant access to the electronic storage when the first portion of the first key is identical to the corresponding portion of the second key; and
deny access to the electronic storage when the first portion of the first key is not identical to the corresponding portion of the second key.

17. The secure IC of claim 15, wherein the processor is further configured to generate the first key using identification information of an apparatus that includes the secure IC and to generate the second key using identification information of the device.

18. The secure IC of claim 15, wherein the processor is further configured to grant the device access to the electronic storage by simultaneously using the first key and the second key to unlock the electronic lock.

19. The secure IC of claim 15, wherein the processor is further configured to receive the second key over a secure channel.

20. The secure IC of claim 19, wherein the processor is further configured to generate a temporary second key, and to temporarily grant another device access to the electronic storage by using the first key and the temporary second key.

* * * * *